US010027596B1

(12) United States Patent
Harwood (10) Patent No.: US 10,027,596 B1
(45) Date of Patent: Jul. 17, 2018

(54) HIERARCHICAL MAPPING OF APPLICATIONS, SERVICES AND RESOURCES FOR ENHANCED ORCHESTRATION IN CONVERGED INFRASTRUCTURE

(71) Applicant: EMC Corporation, Hopkinton, MA (US)

(72) Inventor: John S. Harwood, Paxton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 206 days.

(21) Appl. No.: 15/139,881

(22) Filed: Apr. 27, 2016

(51) Int. Cl.
*H04L 12/12* (2006.01)
*H04L 12/911* (2013.01)
*H04L 12/26* (2006.01)
*G06F 17/30* (2006.01)

(52) U.S. Cl.
CPC ........ *H04L 47/70* (2013.01); *G06F 17/30917* (2013.01); *H04L 43/045* (2013.01)

(58) Field of Classification Search
CPC .. H04L 47/70; H04L 43/045; G06F 17/30917
See application file for complete search history.

(56) References Cited

U.S. PATENT DOCUMENTS

| | | | | |
|---|---|---|---|---|
| 8,214,875 B2 * | 7/2012 | John | ..................... | H04L 63/102 726/1 |
| 9,288,148 B1 * | 3/2016 | Krishnaswamy | ... | H04L 41/0893 |
| 9,350,681 B1 * | 5/2016 | Kitagawa | ................ | H04L 47/70 |
| 9,645,805 B2 * | 5/2017 | Govindaraju | ............. | G06F 8/60 |
| 2010/0125665 A1 * | 5/2010 | Simpson | ............ | G06F 11/3409 709/224 |
| 2013/0232498 A1 * | 9/2013 | Mangtani | ............. | G06F 9/5072 718/104 |

(Continued)

OTHER PUBLICATIONS

"What is Docker" posted on Sep. 3, 2014 at < https://opensource.com/resources/what-docker>.*

(Continued)

*Primary Examiner* — Scott B Christensen
(74) *Attorney, Agent, or Firm* — Ryan, Mason & Lewis, LLP (57) ABSTRACT

An apparatus comprises a processing platform implementing a plurality of resources of converged infrastructure of an information processing system. A controller associated with the plurality of resources comprises a resource discovery module and a hierarchical mapper. The resource discovery module is configured to identify and categorize the resources of the converged infrastructure. The hierarchical mapper is configured to map at least first and second applications of the processing platform to respective sets of services utilized by those applications and to map each of the services to respective sets of resources utilized by those services so as to provide a hierarchical mapping of applications, services and resources for the converged infrastructure. One or more resulting hierarchical mappings generated by the hierarchical mapper are stored in a database and utilized by the controller to implement orchestration functionality for one or more additional applications of the processing platform.

20 Claims, 5 Drawing Sheets

(56) References Cited

U.S. PATENT DOCUMENTS

| | | | |
|---|---|---|---|
| 2014/0059196 A1* | 2/2014 | Onffroy | H04L 41/0856 709/223 |
| 2014/0075445 A1* | 3/2014 | Wang | G06F 9/50 718/104 |
| 2014/0082201 A1* | 3/2014 | Shankari | H04L 47/70 709/226 |
| 2014/0109094 A1 | 4/2014 | Datla et al. | |
| 2014/0109097 A1 | 4/2014 | Datla et al. | |
| 2015/0378703 A1* | 12/2015 | Govindaraju | G06F 8/60 717/174 |
| 2016/0173338 A1* | 6/2016 | Wolting | H04L 41/145 709/223 |
| 2016/0359912 A1* | 12/2016 | Gupta | H04L 63/1425 |
| 2017/0093640 A1* | 3/2017 | Subramanian | H04L 41/12 |

OTHER PUBLICATIONS

U.S. Appl. No. 14/863,958 filed in the name of John S. Harwood et al. filed Sep. 24, 2015 and entitled "Multi-Dimensional Scheduling in Converged Infrastructure."

* cited by examiner

HIERARCHICAL MAPPING OF APPLICATIONS, SERVICES AND RESOURCES FOR ENHANCED ORCHESTRATION IN CONVERGED INFRASTRUCTURE

FIELD

The field relates generally to information processing systems, and more particularly to techniques for managing resource utilization in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system. However, significant challenges remain in deployment of resources for sharing by multiple applications in virtualization infrastructure and other types of converged infrastructure comprising racks of components. For example, in such environments it can be difficult to provide optimal resource utilization across resource pools that include distinct monolithic resources. Similar issues can arise with other types of resources of converged infrastructure.

SUMMARY

Illustrative embodiments provide techniques for hierarchical mapping of applications, services and resources in converged infrastructure. Such arrangements facilitate the effective utilization of distinct monolithic resources as well as other types of resources in converged infrastructure. Moreover, related functionality such as orchestration, analytics or visualization involving the resources is also facilitated.

In one embodiment, an apparatus comprises a processing platform implementing a plurality of resources of converged infrastructure of an information processing system. A controller associated with the plurality of resources comprises a resource discovery module and a hierarchical mapper. The resource discovery module is configured to identify and categorize the resources of the converged infrastructure. The hierarchical mapper is configured to map at least first and second applications of the processing platform to respective sets of services utilized by those applications and to map each of the services to respective sets of resources utilized by those services so as to provide a hierarchical mapping of applications, services and resources for the converged infrastructure. One or more resulting hierarchical mappings generated by the hierarchical mapper are stored in a database and utilized by the controller to implement orchestration functionality for one or more additional applications of the processing platform.

Some embodiments further comprise an orchestrator configured to arrange resources into services for use by one or more of the additional applications based at least in part on the hierarchical mapping.

Other embodiments further comprise an analytics engine configured to utilize the hierarchical mapping to implement analytics functionality for the converged infrastructure of the processing platform.

In some embodiments, a visualization generator is configured to generate a graphical representation of the hierarchical mapping for presentation in a user interface. The graphical representation comprises a plurality of elements at each of a plurality of hierarchical levels. Double-clicking on or otherwise actuating a given one of the elements of a given one of the hierarchical levels via the user interface causes interconnections between the given element and related elements in one or more other hierarchical levels to be highlighted in the graphical representation.

Illustrative embodiments described herein provide significant improvements relative to conventional arrangements. For example, in some of these embodiments, difficulties associated with underutilization of particular resources in conventional arrangements are avoided, and functionality such as orchestration, analytics and visualization is facilitated, leading to improvements in overall resource utilization and performance in an information processing system comprising converged infrastructure.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as converged infrastructure.

Figure 1:
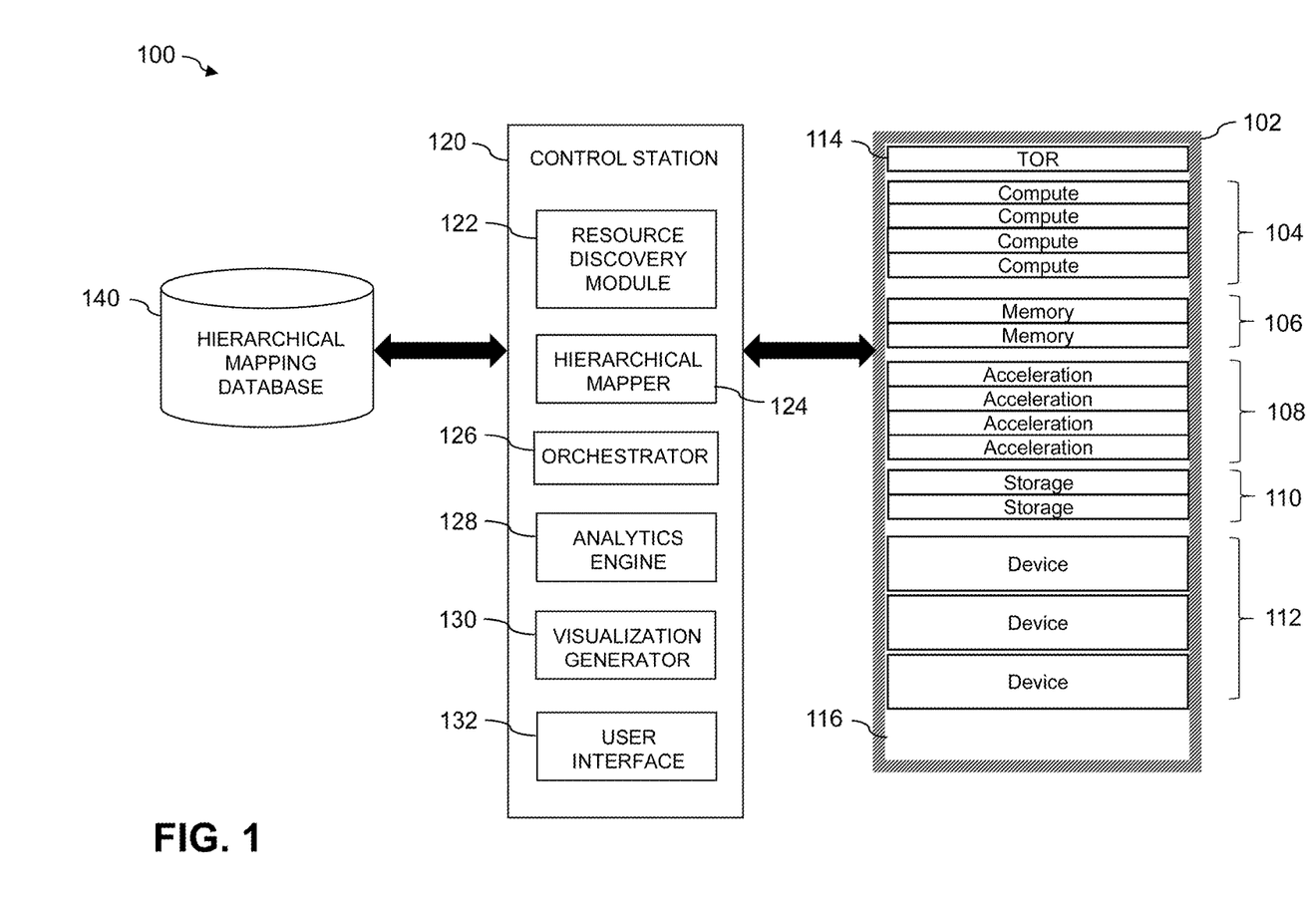
FIG. 1 is a block diagram of an information processing system comprising converged infrastructure in the form of a rack of resource components having an associated control station configured to implement hierarchical mapping of applications, services and resources in an illustrative embodiment.

FIG. 1 shows an information processing system 100 configured in accordance with an illustrative embodiment. The system 100 comprises a rack 102 of components with one or more of the components being associated with at least one particular monolithic resource. The resources in the rack 102 of components in this embodiment illustratively include respective compute resources 104, memory resources 106, acceleration resources 108, storage resources 110 and device resources 112. The rack 102 further includes a top-of-rack (TOR) component 114 at an upper portion of the rack and additional space 116 at a lower portion of the rack. The TOR component 114 illustratively includes one or more switch fabrics for connecting other components of the rack 102 to a network or to other racks of the system 100. It may be considered another type of resource of the system 100. The additional space 116 is typically configured to accommodate additional rack-related equipment such as fans, power supplies, heat sinks or other similar components.

Although only a single rack 102 is shown in this embodiment, it should be understood that the system 100 can include multiple additional racks. These and other rack arrangements comprising components such as compute resources 104, memory resources 106, acceleration resources 108, storage resources 110 and device resources 112 should be viewed as examples of what are more generally referred to herein as "converged infrastructure" of an information processing system.

Such converged infrastructure in some embodiments may comprise at least portions of VxRail™, VxRack™ or Vblock® converged infrastructure commercially available from VCE, the Virtual Computing Environment Company, an EMC Federation Company of the EMC Corporation of Hopkinton, Mass.

The information processing system 100 further comprises a control station 120 coupled to or otherwise associated with the rack 102. Although shown as a separate component relative to the rack 102 in this illustrative embodiment, the control station 120 can be implemented at least in part within one or more of the components of the rack 102, such as within the TOR component 114. Additionally or alternatively, the control station 120 can be implemented at least in part within a different rack of the system 100, although such an additional rack is not explicitly shown in the figure. The control station 120 is considered part of the converged infrastructure of the system 100.

The control station 120 in some embodiments comprises a compute element that has network connectivity and accordingly can reside anywhere within the system 100. Other components of the system 100 such as the resources 104 through 112 and the TOR component 114 can each include one or more clients that communicate with corresponding control elements of the control station 120.

The rack 102 comprising resources 104 through 112, TOR component 114 and the associated control station 120 collectively comprise at least one processing platform implementing a plurality of resources of the converged infrastructure of the information processing system 100. Such a processing platform illustratively comprises multiple processing devices each comprising a processor coupled to a memory. For example, a given processing device or set of multiple processing devices may be used to implement the control station 120.

The control station 120 is an example of what is more generally referred to herein as a "controller" associated with the resources of the processing platform. In the present embodiment, the control station 120 is assumed to be part of the processing platform that comprises the rack 102, but in other embodiments the control station can be otherwise associated with the resources of the processing platform. For example, it may be implemented on an entirely separate processing platform that communicates over one or more networks with components of the processing platform that comprises the rack 102.

The control station 120 in the FIG. 1 embodiment illustratively comprises a resource discovery module 122, a hierarchical mapper 124, an orchestrator 126, an analytics engine 128, a visualization generator 130 and a user interface 132. A hierarchical mapping database 140 is coupled to the control station 120.

The resource discovery module 122 is configured to identify and categorize the resources of the converged infrastructure. For example, the resource discovery module 122 may be configured to identify a plurality of resources and then to categorize the identified resources by generating a resource catalog that incorporates those resources. A more particular example of such a resource catalog will be described below in conjunction with FIG. 3.

The resource discovery module 122 can be activated to discover resources in conjunction with periodic provisioning or reprovisioning operations carried out within a data center that alter its mix of resources, as well as under additional or alternative conditions necessitating such discovery. This ensures that an accurate assessment of data center resources is always available as a focal point for orchestration.

The hierarchical mapper 124 is configured to map at least first and second applications of the processing platform to respective sets of services utilized by those applications and to map each of the services to respective sets of resources utilized by those services so as to provide a hierarchical mapping of applications, services and resources for the converged infrastructure. The resulting hierarchical mapping is stored with other hierarchical mappings generated by the hierarchical mapper 124 in the hierarchical mapping database 140.

At least a portion of a given one of the sets of resources associated with a particular one of the services is assumed to be part of a container comprising an associated grouping of resources in which an associated application is configured to run in performing a corresponding processing job. The container illustratively comprises a Docker container or other type of Linux container, also referred to as an LXC.

A given element of an example hierarchical mapping corresponding to a particular one of the resources illustratively includes an identifier of a rack in which that particular resource is located.

In the case of hardware resources, a given element of an example hierarchical mapping corresponding to a particular hardware resource illustratively includes identifiers of one or more software resources provisioned to that particular hardware resource for use in implementing an associated service.

The hierarchical mapper 124 illustratively leverages the resource discovery module 122 to construct hierarchical mappings that link together all related applications, services and resources of the converged infrastructure. Such an arrangement allows the orchestrator 126 to interrogate existing application, service or resource elements at any level of the hierarchical mapping and to utilize the relationships among those elements in orchestrating additional applications, services and resources within the system. For example, additional services can be created and built using underlying resources, and additional applications can be created and built using underlying services. It is also possible to orchestrate new services as a collection of existing services characterized by the hierarchical mapping. These services can be shared and provisioned to one or more applications, entered in a catalog and advertised through the hierarchical mapping database 140 as consumable elements. As a more particular example, flow information captured for certain existing resources, such as network-related features of compute, memory, acceleration, storage or device resources, can be used to map to services that are connected to build an application.

The orchestrator 126, analytics engine 128 and visualization generator 130 can access the hierarchical mapping database 140 via an application programming interface (API). Such an API can additionally be used to permit any of a wide variety of other types of tools to access and utilize the hierarchical mappings.

Additional details regarding example hierarchical mapping arrangements of the type described above will be provided below in conjunction with the description of the embodiments of FIGS. 4 and 5.

The orchestrator 126 utilizes one or more of the hierarchical mappings generated by the hierarchical mapper 124 and stored in the hierarchical mapping database 140 to implement orchestration functionality for one or more additional applications of the processing platform comprising rack 102. For example, the orchestrator 126 can arrange resources of the rack 102 into services for use by one or more of the additional applications based at least in part on the hierarchical mapping.

The analytics engine 128 also utilizes the hierarchical mappings generated by the hierarchical mapper 124 and stored in the hierarchical mapping database 140. For example, the analytics engine 128 can utilize the hierarchical mappings to implement analytics functionality for the converged infrastructure of the processing platform. Such analytics functionality can involve querying one or more hierarchical mappings in order to create a utilization graph for the converged infrastructure as a whole, for particular applications, services and resources, or particular combinations thereof.

In some embodiments, the resource discovery module 122 populates the hierarchical mapping database 140 with resource entries as part of a resource catalog. Such resource entries illustratively form part of a hierarchical mapping and can include location information indicating the particular rack or other location of the resource in a data center as well as any telemetry information for the resource indicating the current utilization state or other current parameter values of that resource.

The orchestrator 126 is illustratively configured to interact with application requests as well as existing hierarchical mappings in the hierarchical mapping database 140. For example, services can be composed on the resources and a new entry for each service can be made in the database. This entry for the new service will identify the consumed resources via links of the hierarchical mapping and the consumed resources will similarly link to the services that utilize those resources. A given hierarchical mapping can include bidirectional links from applications to services to resources.

Entries in the hierarchical mapping can be double-clicked or otherwise actuated in an interactive visualization presented on user interface 132 in order to highlight the interconnected elements of the hierarchical mapping within the corresponding data center. As new applications are provisioned, the required services and resources can be analyzed to determine the optimal configuration. For example, resource telemetry can be interrogated to understand possible resource and service sharing arrangements as well as the best placement across the data center for a given instantiation of an application. One or more hierarchical mappings in the hierarchical mapping database 140 illustrate all interconnections of applications, services and resources within the data center. Optimization can be achieved and analytics performed by leveraging the interconnection links in the hierarchical mapping database 140.

The hierarchical mapping database 140 in some embodiments is configured utilizing JavaScript Object Notation (JSON) entries, although other formats can be used. For example, resources discovered by the resource discovery module 122 can be entered as a series of respective JSON entries. Similar JSON entries can be used for each of the applications and services characterized by a given hierarchical mapping.

These entries can be annotated to demonstrate interconnections, locality and other features or characteristics. For example, each resource entry can be annotated with information such as rack, network, adaptors, operating system and software associated with that resource, as well as identifiers of the services that consume those resources. Examples of network-related information included in a resource entry can include network address with respect to leaf-spine connectivity, hops, latency and performance.

Service entries can be configured in a similar manner to include various service attributes as well as identifiers of the resources consumed by the corresponding services. In addition, for each consumed resource, a percentage or other value indicating the consumed portion of the overall resource is identified. For example, if a hardware resource comprises a total of 8 processor cores, and a service consuming that resource uses only 4 of the 8 processor cores, that information can be incorporated into the service entry.

Application entries can also be configured in a similar manner to include various application attributes as well as identifiers of the services consumed by the corresponding applications. This information can include percentages or other values indicating the consumed portion of the overall service.

The resource, service and application entries can each be queried to determine linkages with other instances of such entries within a given hierarchical mapping stored in the hierarchical mapping database 140. For example, the orchestrator 126 can query such entries in order to configure new applications and services. Also, the analytics engine 128 can query such entries in order to perform analytics on the converged infrastructure.

In some embodiments, the system 100 implements a feedback loop in which the analytics engine 128 monitors resource utilization or other performance characteristics based on the hierarchical mappings, and provides feedback to the orchestrator 126. This feedback allows the orchestrator to adjust the configurations and relationships of applications, services and resources in order to improve the operation of the system 100. For example, workloads can be scheduled based on analytic feedback and tuning to best match resources. This can be implemented as an ongoing feedback loop which connects to orchestration functionality in order to best map scheduled application profile requests with constraints to the hierarchical mapping of elements in the hierarchical mapping database 140. The analytics engine 128 in such an arrangement can utilize the hierarchical mappings to identify possible contention, oversubscription, conflict, underutilization or other conditions that can be leveraged by the orchestrator 126. Accordingly, analytics can determine both historical usage of applications, services and resources as well as aid in scheduling future applications and services so as to meet requirements and optimize resource utilization based on constraints.

The visualization generator 130 is illustratively configured to generate a graphical representation of the hierarchical mapping for presentation in the user interface 132. For example, the graphical representation illustratively comprises a plurality of elements at each of a plurality of hierarchical levels. Actuation of a given one of the elements of a given one of the hierarchical levels via the user interface 132 illustratively causes interconnections between the given element and related elements in one or more other hierarchical levels to be highlighted in the graphical representation.

The control station 120 may comprise additional or alternative components relative to those shown in the illustrative embodiment of FIG. 1. For example, in some embodiments the control station 120 may comprise a multi-dimensional scheduler associated with the resources of the rack 102 including the compute resources 104, memory resources 106, acceleration resources 108, storage resources 110 and device resources 112. Such a multi-dimensional scheduler may be configured to logically partition at least first and second ones of the resources 104 through 112 into multiple virtual sets of resources for performance of processing jobs associated with respective applications. As a result of this logical partitioning, the multiple virtual sets of resources comprise respective portions of each of the first and second ones of the plurality of resources. Moreover, the multi-dimensional scheduler is further configured to control time sharing of at least an additional one of the resources 104 through 112 between at least a subset of the multiple virtual sets of resources in performing the corresponding processing jobs associated with the respective applications.

A multi-dimensional scheduler of this type performs scheduling of the first and second resources over a spatial dimension and scheduling of the at least one additional resource over a time dimension. This scheduling of certain ones of the resources 104 through 112 over a spatial dimension and scheduling of other ones of the resources 104 through 112 over a time dimension is an example of what is more generally referred to herein as "multi-dimensional scheduling" of resources in converged infrastructure. Other embodiments can utilize additional or alternative types of scheduling not involving multiple dimensions.

The first and second resources that are subject to scheduling over a spatial dimension through logical partitioning can include different combinations of the resources 104 through 112. For example, the first and second resources can comprise respective compute and storage resources 104 and 110. Alternatively, the first and second resources can comprise respective memory and device resources 106 and 112. In the latter arrangement, the device resources can illustratively comprise network interface resources or other types of device resources. Numerous alternative arrangements of two or more of the resources 104 through 112 can be subject to scheduling over a spatial dimension through logical partitioning. Accordingly, the first and second resources comprise respective ones of the resources 104 through 112 that are subject to logical partitioning and the additional resource comprises at least one of the resources 104 through 112 that is not subject to logical partitioning.

Additional details regarding a multi-dimensional scheduler that may be incorporated in or otherwise associated with control station 120 in illustrative embodiments is disclosed in U.S. patent application Ser. No. 14/863,958, filed Sep. 24, 2015 and entitled "Multi-Dimensional Scheduling in Converged Infrastructure, which is commonly assigned herewith and incorporated by reference herein.

In embodiments of this type, it is assumed for purposes of illustration that the particular additional resource that is not subject to logical partitioning comprises at least a portion of the acceleration resources 108. A given acceleration resource of the acceleration resources 108 in some embodiments is specifically configured for performance of a singular processing job of a particular type, and is therefore also referred to herein as a monolithic resource. By way of example, the acceleration resources 108 may be implemented utilizing a field-programmable gate array (FPGA), an application-specific integrated circuit (ASIC) or a graphics processing unit (GPU), as well as various combinations of these and other specialized hardware acceleration elements.

The acceleration resources 108 if subject to logical partitioning among applications or other users of these resources can lead to sub-optimal utilization of the available resources of rack 102 as a whole. The multi-dimensional scheduler is therefore configured to apply a different type of scheduling to the acceleration resources 108, namely, one in which the acceleration resources 108 are time-shared among the multiple virtual sets of resources that are formed by logical partitioning of two or more of the other resources 104, 106, 110 and 112. This multi-dimensional scheduling tends to improve the overall utilization of a resource pool comprising all of the resources 104 through 112 of the rack 102, leading to improved performance in the system 100 relative to conventional arrangements.

As noted above, at least portions of the TOR component 114 can also be considered resources that are subject to either logical partitioning or time sharing depending upon the particular implementation. Accordingly, references herein to multi-dimensional scheduling of the resources of the rack 102 can in some embodiments involve application of such scheduling to at least portions of the TOR component 114.

The logical partitioning of resources such as the resources 104, 106, 110 and 112 can be performed using techniques that are typically used to provide virtual resources to applications or other users. For example, compute resources 104 can be logically partitioned into a plurality of virtual central processing units (CPUs). Similarly, memory resources 106 can be logically partitioned into a plurality of virtual flash memories, and storage resources 110 can be logically partitioned into a plurality of virtual storage volumes. Assuming that the device resources include network interface resources, the network interface resources can be partitioned into a plurality of virtual network interface cards (NICs).

Such partitioning is utilized to schedule resources along what is referred to herein as a spatial dimension. A given set of virtual resources scheduled in this manner by the multi-dimensional scheduler may comprise, for example, a virtual CPU from the compute resources 104, a virtual flash memory from the memory resources 106, a virtual storage volume from the storage resources 110 and a virtual NIC from the network interface resources of the device resources 112. Numerous other combinations of virtual resources may be used in configuring the above-noted multiple virtual sets of resources for performance of processing jobs associated with respective applications in the system 100.

In some embodiments, a given one of the virtual sets of resources and its time-shared portion of at least one additional resource are part of a container comprising an associated grouping of resources in which the associated application is configured to run in performing the corresponding processing job. Such a container illustratively comprises a Docker container or other type of LXC. The containers may be associated with respective tenants of a multi-tenant environment of the system 100, although in other embodiments a given tenant can have multiple containers.

The containers may be utilized to implement a variety of different types of functionality within the system 100. For example, such containers can be used to implement platform-as-a-service (PaaS) or infrastructure-as-a-service (IaaS) functionality in system 100, as well as microservices of converged infrastructure within a data center or other cloud computing and storage system. As a more particular example, containers can be used to implement respective cloud compute nodes or cloud storage nodes of a cloud computing and storage system. Such compute nodes or storage nodes may be associated with respective cloud tenants of a multi-tenant environment of system 100.

It is to be appreciated that the particular arrangement of system elements shown in FIG. 1 is for purposes of illustration only, and that other arrangements of additional or alternative elements can be used in other embodiments. For example, numerous alternative system configurations can be used to implement hierarchical mapping of applications, services and resources in converged infrastructure as disclosed herein.

The operation of an illustrative embodiment of an information processing system will now be described in further detail with reference to the flow diagram of FIG. 2. The process as shown includes steps 200 through 206. These steps are assumed in the present embodiment to be performed at least in part by a control station such as control station 120 in the FIG. 1 embodiment possibly in conjunction with one or more other elements of converged infrastructure of an information processing system. The control station and any such other elements of the converged infrastructure are assumed to be implemented by at least one processing device comprising a processor coupled to a memory.

In step 200, resources of converged infrastructure of a processing platform are identified and categorized. For example, in the context of the FIG. 1 embodiment, resources such as compute resources 104, memory resources 106, acceleration resources 108, storage resources 110 and device resources 112 are identified and categorized.

In step 202, at least first and second applications of the processing platform are mapped to respective sets of services utilized by those applications, and each of the services is mapped to sets of resources utilized by those services, so as to provide a hierarchical mapping of applications, services and resources for the converged infrastructure. By way of example, a given element of the hierarchical mapping corresponding to a particular hardware resource may include identifiers of one or more software resources provisioned to that particular hardware resource for use in implementing an associated service. Additionally or alternatively, a given element of the hierarchical mapping corresponding to a particular one of the resources includes an identifier of a rack in which that particular resource is located. A wide variety of additional information relating applications to services and services to resources can be incorporated into a hierarchical mapping in a given embodiment.

In step 204, the hierarchical mapping is utilized to implement orchestration functionality for one or more additional applications of the processing platform. For example, orchestrator 126 of control station 120 in the FIG. 1 embodiment is illustratively configured to arrange resources into services for use by one or more of the additional applications based at least in part on the hierarchical mapping.

In step 206, the hierarchical mapping is utilized to implement analytics functionality for the converged infrastructure of the processing platform.

Figure 2:
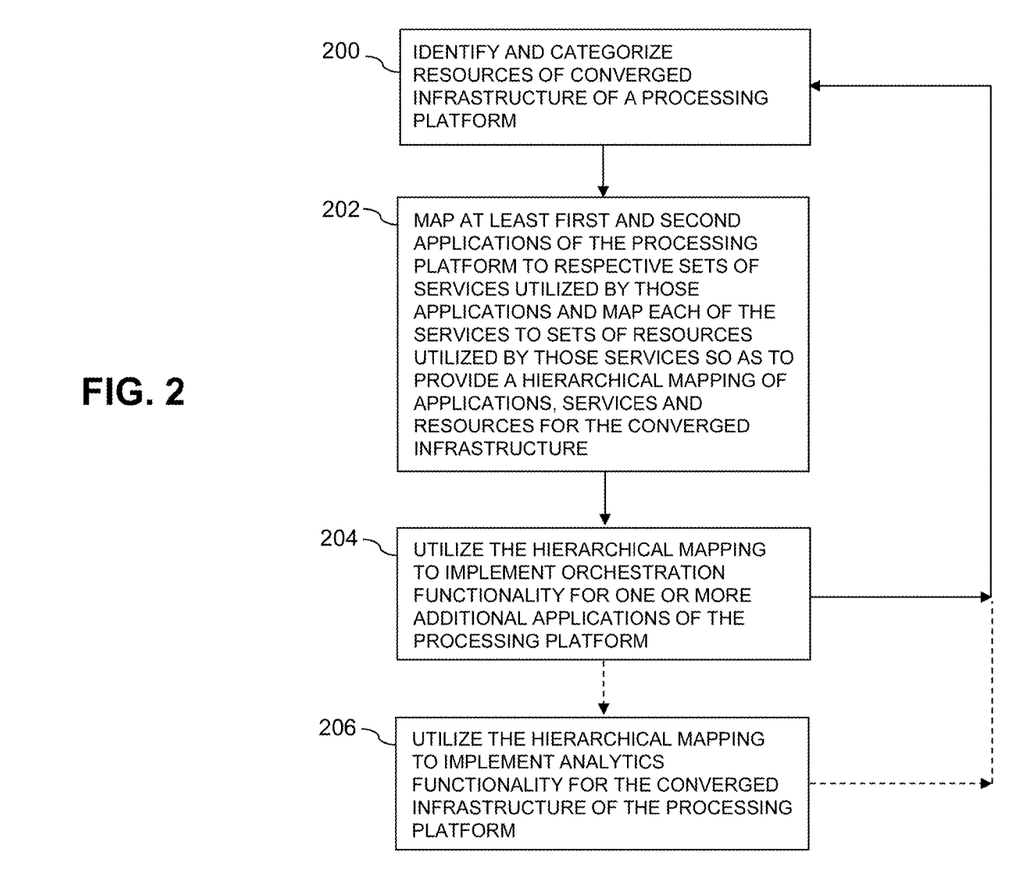
FIG. 2 is a flow diagram of a process for hierarchical mapping of applications, services and resources in converged infrastructure in an illustrative embodiment.

The FIG. 2 process may include additional or alternative steps. For example, as an additional or alternative step, the process may comprise generating a graphical representation of the hierarchical mapping for presentation in a user interface wherein the graphical representation comprises a plurality of elements at each of a plurality of hierarchical levels. The graphical representation is illustratively configured such that actuation of a given one of the elements of a given one of the hierarchical levels via the user interface causes interconnections between the given element and related elements in one or more other hierarchical levels to be highlighted in the graphical representation.

A controller configured to implement at least portions of the FIG. 2 process can include elements of the type previously described in conjunction with the embodiment of FIG. 1. For example, the controller can include an orchestrator configured to provide information regarding the resources to a scheduler and to build functions based on the resources for utilization in performing the processing jobs.

In an illustrative embodiment that includes a multi-dimensional scheduler of the type previously described, a given one of a plurality of virtual sets of resources and a corresponding time-shared portion of an additional resource can be bound together by the orchestrator 126 into one or more functions utilized to meet specified requirements of the associated application in performing the corresponding processing job. Such functions are illustratively each configured to support pause and resume functionality through persistence of state information until terminated. Multiple functions can be combined to support the provision of a wide variety of services within the system. Again, use of multi-dimensional scheduling is not required, and can be replaced with other types of scheduling in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations involving hierarchical mapping of applications, services and resources in converged infrastructure. For example, the ordering of the process steps may be varied in other embodiments, or certain steps may be performed concurrently with one another rather than serially as shown. Also, one or more of the process steps may be repeated periodically for different processing scenarios, or performed in parallel with one another. For example, parallel instantiations of one or more of the process steps can be implemented for different groups of tenants within the system.

Hierarchical mapping functionality such as that described in conjunction with the flow diagram of FIG. 2 can be implemented at least in part in the form of one or more software programs stored in memory and executed by a processor of a processing device such as a computer or server. For example, the control station 120 illustratively comprises one or more software programs configured to run on underlying hardware of at least one processing device. As will be described below, a memory or other storage device having executable program code of one or more software programs embodied therein is an example of what is more generally referred to herein as a "processor-readable storage medium."

Additional details regarding illustrative embodiments of the invention will now be described with reference to FIGS. 3 through 5.

Figure 3:
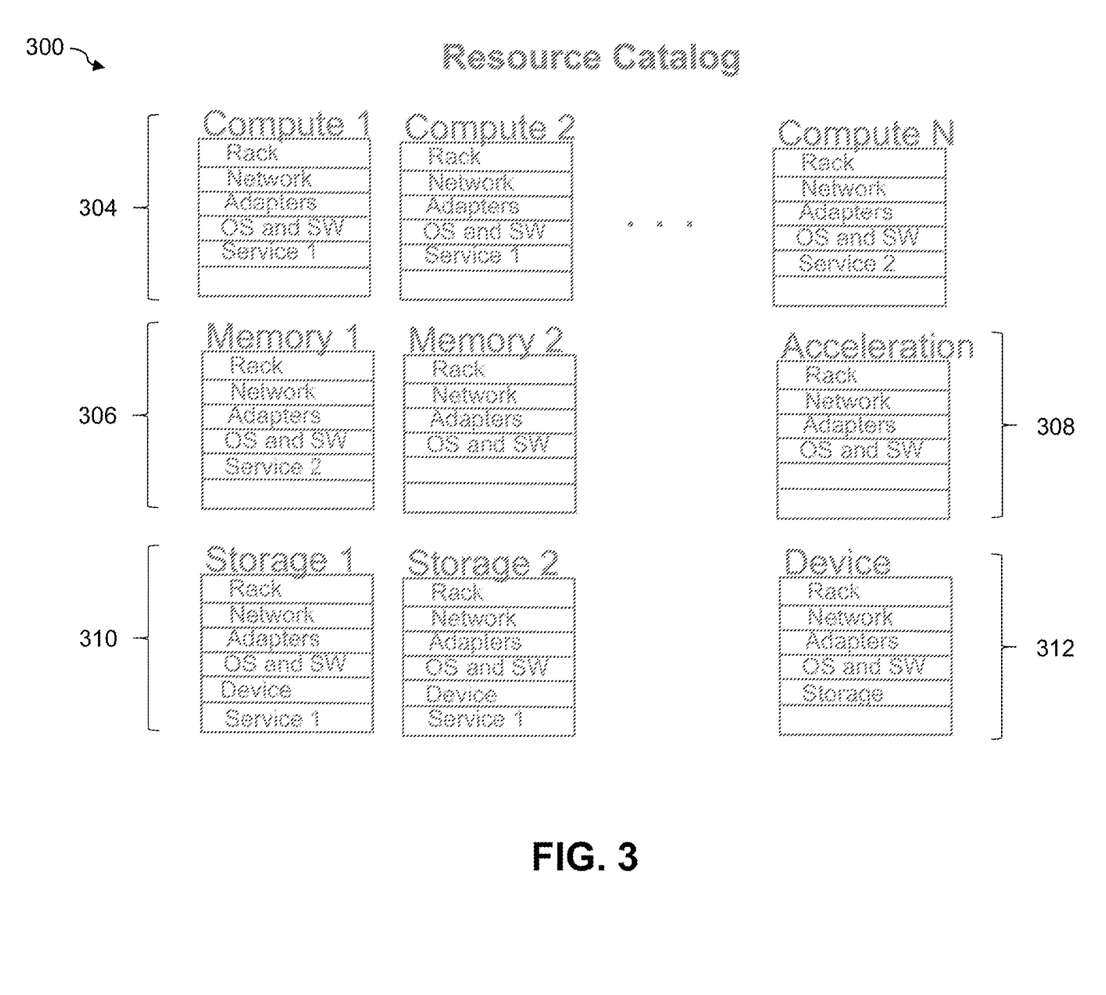
FIG. 3 shows an example of a resource catalog that may be utilized in conjunction with hierarchical mapping of applications, services and resources in the converged infrastructure of FIG. 1.

Referring now to FIG. 3, an example of a resource catalog 300 is shown. The resource catalog 300 is utilized in conjunction with hierarchical mapping of applications, services and resources in converged infrastructure of a processing platform, such as the converged infrastructure of system 100 of FIG. 1. The resource catalog 300 is generated by identifying and characterizing the resources of the rack 102. The resource catalog includes compute resource entries 304, memory resource entries 306, an acceleration resource entry 308, storage resource entries 310 and a device resource entry 312.

The compute resource entries 304 in this embodiment more particularly comprise entries for respective compute resources denoted Compute 1, Compute 2, . . . Compute N. The memory resource entries 306 comprise entries for respective memory resources denoted Memory 1 and Memory 2. The acceleration resource entry 308 comprises only a single entry denoted Acceleration. The storage resource entries 310 comprise entries for respective storage resources denoted Storage 1 and Storage 2. The device resource entry 312 comprises only a single entry denoted Device. Although only single entries are shown for each of the acceleration and device resources in the FIG. 3 embodiment, such resources could each include multiple entries in other embodiments.

It is to be appreciated that this particular resource listing in the resource catalog 300 represents only an identified and characterized subset of all of the resources of the rack 102. Additional identification and categorization operations implemented by resource discovery module 122 can be applied to the remaining resources of the rack 102 in order to generate additional resource entries in the resource catalog 300. Moreover, similar operations can be performed to identify and categorize resources of one or more additional racks of a given data center. Accordingly, a resource catalog in a given embodiment can include entries for respective resources of multiple racks.

The resource entries in the resource catalog 300 are more particularly in the form of respective multi-line tables as illustrated in the figure. The first line of each of the multi-line tables in the resource catalog 300 includes an identifier of a rack in which that particular resource is located. This first line of the multi-line table for a given resource entry of the resource catalog 300 is denoted "Rack." Other lines in the multi-line table for a given resource entry include lines for "Network," "Adapters," and "OS and SW," where OS denotes operating system and SW denotes software. Some resources have one or more additional lines in their respective multi-line tables for "Service" or "Device."

The Network, Adapters, OS and SW, Service and/or Device lines in a given one of the multi-line tables for a resource entry of the resource catalog 300 include identifiers of these specific respective features for the corresponding resource. Thus, for example, the compute resource Compute 1 utilizes particular network, adapters, OS and SW, identified by the identifiers in their respective lines of the corresponding multi-line table, and is utilized by a service denoted Service 1. Similarly, the memory resource Memory 1 utilizes particular network, adapters, OS and SW, identified by the identifiers in their respective lines of the corresponding multi-line table, and is utilized by a service denoted Service 2. The other multi-line tables for the respective other resource entries of the resource catalog 300 are configured in a similar manner.

As indicated previously, acceleration resources having respective resource entries such as resource entry 308 in the FIG. embodiment illustratively comprise FPGAs, ASICs or GPUs. The acceleration resources can include additional or alternative acceleration elements of other types. Such acceleration elements are generally monolithic in nature, in that they are programmed or otherwise configured to provide particular designated types of functionality within the system. These and other monolithic resources of the system 100 may not be suitable for logical partitioning. A given physical set of resources can be replicated as multiple virtual sets of resources of the converged infrastructure.

In some embodiments, logical partitioning is applied to at least first and second ones of the resources of the converged infrastructure by scheduling those resources along a spatial dimension to create multiple virtual sets of resources comprising respective portions of the first and second resources, while one or more other resources of the converged infrastructure are time-shared by the multiple virtual sets of resources through scheduling of the one or more other resources along a time dimension. In these embodiments, it is assumed that the acceleration resources are time-shared through scheduling along the time dimension. Other embodiments need not include such multi-dimensional scheduling functionality.

Figure 4:
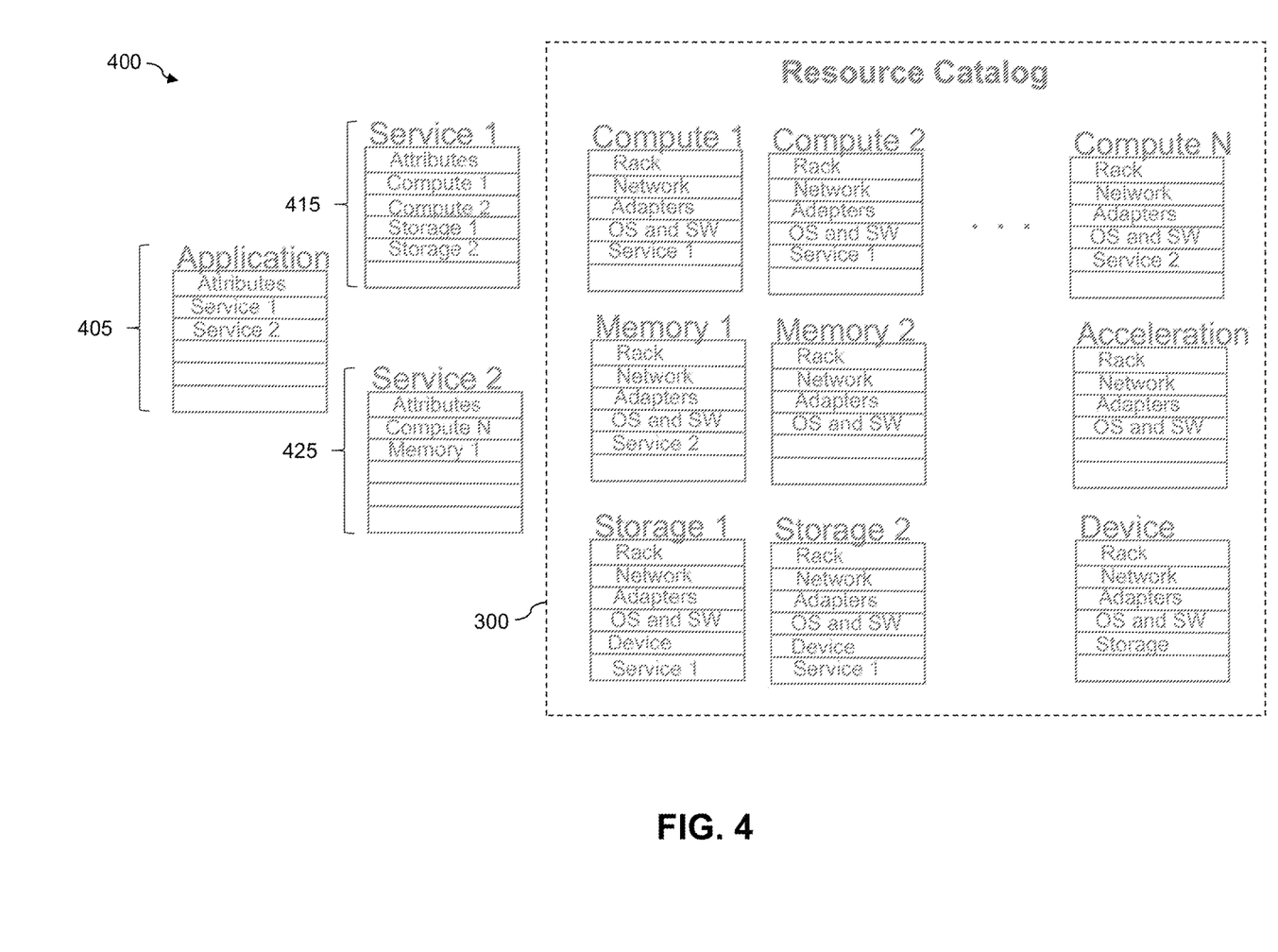
FIG. 4 illustrates an example of a hierarchical mapping that incorporates the resource catalog of FIG. 3.

FIG. 4 illustrates the manner in which a hierarchical mapping can incorporate the resource catalog 300 of FIG. 3. In this embodiment, a hierarchical mapping 400 includes an application entry 405 for a particular application and service entries 415 and 425 for respective services denoted as Service 1 and Service 2. These services Service 1 and Service 2 are assumed to be the same services that are specified in various multi-line tables of certain ones of the resource entries of the resource catalog 300. The hierarchical mapping 400 maps the particular application corresponding to application entry 405 to a set of services utilized by that application, with the set of services in this embodiment including the services Service 1 and Service 2 corresponding to respective service entries 415 and 425.

The application entry 405 comprises a multi-line table having lines for application attributes of the corresponding application, as well additional lines for respective services utilized by that application, illustratively including lines for respective ones of the services denoted Service 1 and Service 2.

The service entries 415 and 425 each comprise a multi-line table having lines for service attributes of the corresponding service, as well additional lines for respective resources utilized by that service, illustratively including lines for respective ones of the resources having entries in the resource catalog 300. For example, service entry 415 indicates that Service 1 utilizes compute resources Compute 1 and Compute 2 and storage resources Storage 1 and Storage 2, with such resources having respective resource entries in the resource catalog 300. Service entry 425 indicates that Service 2 utilizes compute resource Compute N and memory resource Memory 1, again corresponding to respective resource entries in the resource catalog 300.

Although not explicitly indicated in the figure, it is assumed that the hierarchical mapping 400 further comprises a similar mapping for each of one or more other applications configured to run within the converged infrastructure of the processing platform to services and resources utilized by those applications. Accordingly, the hierarchical mapping 400 illustratively provides a hierarchical mapping of applications, services and resources for the converged infrastructure of the processing platform. This hierarchical mapping is stored in a database and utilized by a controller to implement orchestration functionality for one or more additional applications of the processing platform.

Figure 5:
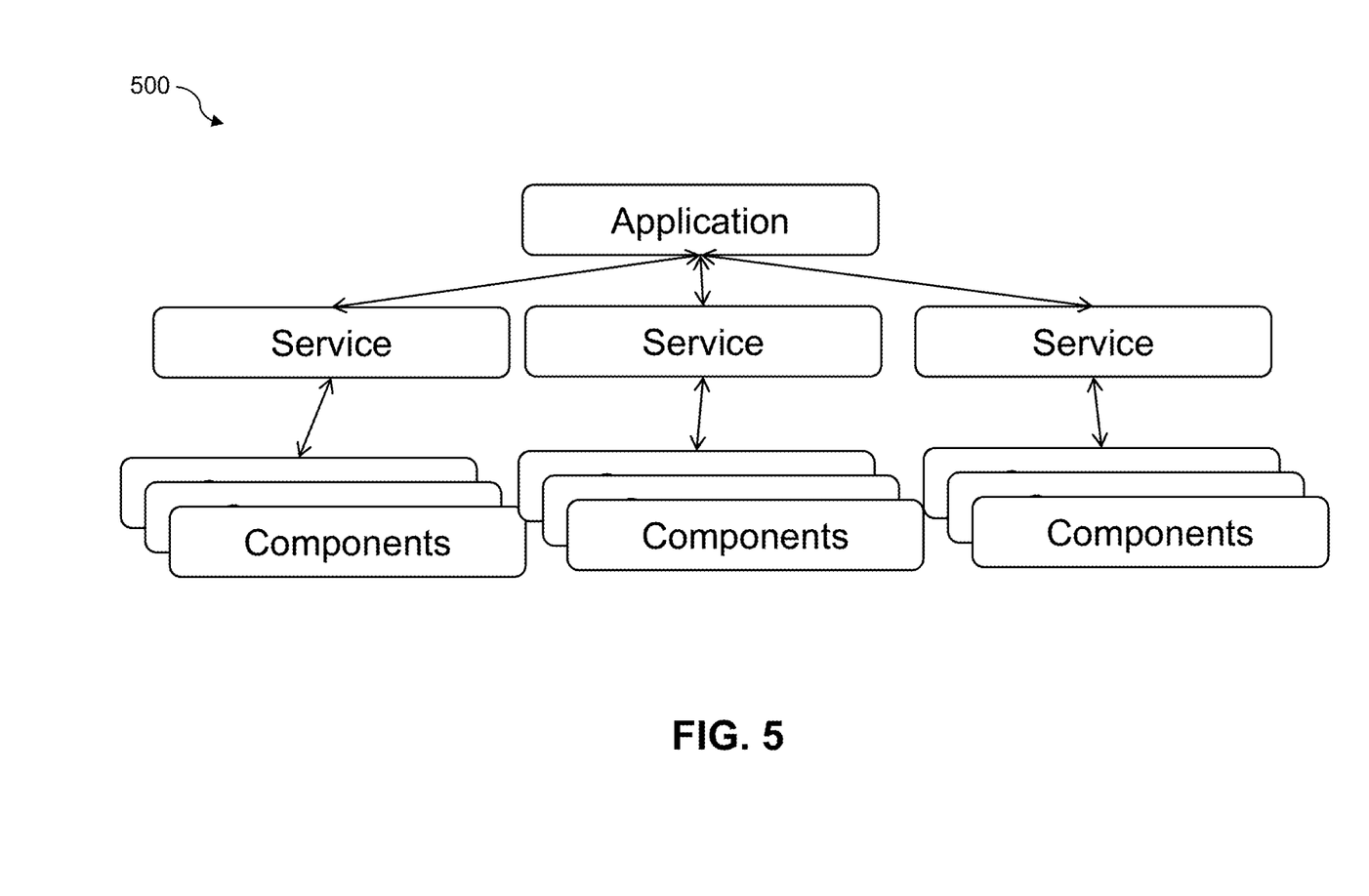
FIG. 5 shows an example of a graphical representation of a portion of a hierarchical mapping of applications, services and resources in another embodiment.

FIG. 5 shows an example of a graphical representation of a portion of a hierarchical mapping of applications, services and resources in another embodiment. In this embodiment, the portion 500 of the hierarchical mapping includes a first level corresponding to an application, a second level corresponding to services utilized by that application, and a third level corresponding to resources utilized by those services. The resources in this embodiment are also referred to as components, and illustratively comprise components of the converged infrastructure of the system 100, such as components of the rack 102 and possibly of one or more additional racks of a data center of the system. It is assumed that the hierarchical mapping that includes portion 500 as illustrated in FIG. 5, will additionally include one or more similar portions for each of one or more other applications configured to run in the converged infrastructure utilizing services and resources of that converged infrastructure. Also, within a given hierarchical mapping of this type, it is assumed that multiple applications can link to the same services and multiple services can link to the same resources.

A graphical representation of the type described above is illustratively generated by a visualization generator and presented to a user via an interactive user interface. For example, visualization generator 130 and user interface 132 of the FIG. 1 embodiment can be configured in this manner. In such an arrangement, the application, service and resource elements of the graphical representation, such as those shown in FIG. 5, illustratively comprise respective actuatable icons configured to be actuated by a user to highlight linkages between the elements in the hierarchical mapping. Accordingly, responsive to a user actuating one of the icons or other elements at a given level of the hierarchical mapping in FIG. 5, interconnections between that element and related elements in one or more other hierarchical levels are highlighted in the graphical representation.

For example, by actuating the element corresponding to a particular resource, the visualization is automatically altered to highlight all of the services and applications that utilize that particular resource. The user can similarly actuate the element corresponding to a particular service in order to be presented with an updated visualization highlighting all of the applications that use that service and all of the resources utilized by that service. As another example, the user can actuate the element corresponding to a particular application in order to be presented with an updated visualization highlighting all of the services used by that application and all of the resources utilized by each of those services. It is also possible that linkages or other interconnections within a given level of the hierarchical mapping can be highlighted as part of such visualization arrangements. Also, multiple distinct visualization types can be provided for selection by a user via the user interface, with the visualization generator providing a different type of visualization having different user interaction functionality based at least in part on a given user selection.

The illustrative embodiments described above provide significant advantages over conventional arrangements. For example, some embodiments are configured to facilitate the effective utilization of distinct monolithic resources as well as other types of resources in converged infrastructure.

At least some of these embodiments leverage relationships captured in a hierarchical mapping of applications, services and resources in order to implement orchestration functionality for additional applications.

Additionally or alternatively, analytics functionality relating to the applications, services and resources of converged infrastructure is facilitated through the use of hierarchical mappings of the type described herein.

Illustrative embodiments facilitate resource sharing among applications and services in converged infrastructure, thereby providing significantly improved resource utilization in data centers and other systems comprising such infrastructure.

The hierarchical mapping is illustratively based on actual resource utilization by applications and services rather than predetermined or predicted usage profiles and therefore provides accurate and useful information even in scenarios in which different types of provisioning, such as top-down and bottom-up provisioning, are performed by different orchestration tools.

The hierarchical mapping can be used to facilitate mapping of similar application workflows to sets of shared resources. Also, application workflows with conflicting profiles can be mapped to distinct sets of resources.

Illustrative embodiments avoid problems that might otherwise arise when independent tools in different domains are utilized for resource and service discovery, and advantageously provide a holistic view of service and resource utilization in the converged infrastructure to system administrators and other users. Moreover, the holistic view captures fine-grained details such as telemetry and other information characterizing interaction of multiple workflows on a given resource. As a result, these embodiments provide overall coordination of applications as well as optimization of resource usage.

The hierarchical mapping in some embodiments facilitates optimal scaling of compute, memory, acceleration, storage and device resources across multiple racks within a given data center or other information processing system.

Some embodiments better meet application requirements by not only discovering resources but also mapping the current resource utilization across both services and applications in a manner that allows orchestration, analytics and other functions to be carried out more accurately and efficiently.

The foregoing advantages are illustrative of advantages provided in certain embodiments, and need not be present in other embodiments.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative arrangements of converged infrastructure may be used.

Also, the particular processing operations and other system functionality described in conjunction with the diagrams of FIGS. 1 through 5 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 through 5 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now described in greater detail. A given such processing platform comprises at least one processing device comprising a processor coupled to a memory.

As mentioned previously, portions of an information processing system as disclosed herein may illustratively comprise cloud infrastructure. The cloud infrastructure in some embodiments comprises a plurality of containers implemented using container host devices and may additionally or alternatively comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, a CPU, an ASIC, an FPGA, a GPU or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

In some embodiments, processing platforms include at least one storage array, at least one storage fabric or a combination of multiple instances of one or more of these and other types of storage devices and systems.

For example, a given processing platform can comprise any of a variety of different types of storage including network-attached storage (NAS), storage area networks (SANs), direct-attached storage (DAS), distributed DAS and software-defined storage (SDS), as well as combinations of these and other storage types.

Accordingly, a given processing platform may be implemented using VNX® and Symmetrix VMAX® storage arrays, SDS products such as ScaleIO™ and ViPR®, flash-based storage arrays such as DSSD™, cloud storage products such as Elastic Cloud Storage (ECS), object-based storage such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given processing platform in an illustrative embodiment.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices. These and other information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, converged infrastructure, resources and controllers that can benefit from hierarchical mapping of applications, services and resources. Also, the particular configurations of system and device elements shown in FIGS. 1 and 3-5 and the processing operations in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform implementing a plurality of resources of converged infrastructure of an information processing system;
   a controller associated with the plurality of resources, the controller comprising at least one processing device comprising a processor coupled to a memory; and
   a database coupled to the controller;
   the controller comprising:
   a resource discovery module configured to identify and categorize the resources of the converged infrastructure; and
   a hierarchical mapper configured:
   to generate one or more hierarchical mappings of applications, services and resources for the converged infrastructure by:

mapping at least first and second applications of the processing platform to respective sets of services utilized by those applications, wherein relationships between the mapped applications and services are expressed as a first set of bidirectional links from the applications to the services; and mapping each of the services to respective sets of the identified and categorized resources utilized by those services, wherein relationships between the mapped services and resources are expressed as a second set of bidirectional links from the services to the resources; and to store the one or more generated hierarchical mappings in the database;

wherein the controller utilizes the one or more stored hierarchical mappings to perform orchestration for one or more additional applications of the processing platform, the orchestration comprising:

querying existing application, service and resource elements at respective levels of the one or more hierarchical mappings stored in the database;

utilizing discovered relationships among those queried elements in determining a particular arrangement for the one or more additional applications based at least in part on the querying; and configuring the one or more additional applications and one or more additional services utilized by the one or more additional applications by automatically arranging resources into services for use by the one or more additional applications.

2. The apparatus of claim 1 wherein the resources of the converged infrastructure comprise at least one rack of components each of a subset of which is associated with at least one particular monolithic resource.

3. The apparatus of claim 1 wherein the resources comprise at least one of compute resources, memory resources, acceleration resources, storage resources and device resources.

4. The apparatus of claim 3 wherein the resources comprise at least acceleration resources and a given one of the acceleration resources is configured for performance of a singular job of a particular type and is implemented using at least one of a field-programmable gate array, an application-specific integrated circuit and a graphics processing unit.

5. The apparatus of claim 1 wherein the resource discovery module categorizes the identified resources by generating a corresponding resource catalog that incorporates those resources.

6. The apparatus of claim 1 wherein at least a portion of a given one of the sets of resources associated with a particular one of the services is part of a container comprising an associated grouping of resources in which an associated application is configured to run in performing a corresponding processing job.

7. The apparatus of claim 6 wherein the container comprises a Docker container or other type of Linux container (LXC).

8. The apparatus of claim 1 wherein the controller comprises at least one control station of a data center comprising a plurality of racks of components.

9. The apparatus of claim 1 wherein a given element of a given one of the one or more hierarchical mappings corresponding to a particular one of the resources includes an identifier of a rack in which that particular resource is located.

10. The apparatus of claim 1 wherein a given element of a given one of the one or more hierarchical mappings corresponding to a particular hardware resource includes identifiers of one or more software resources provisioned to that particular hardware resource for use in implementing an associated service.

11. The apparatus of claim 1 further comprising an orchestrator configured to arrange resources into services for use by one or more of the additional applications based at least in part on the hierarchical mapping.

12. The apparatus of claim 1 further comprising an analytics engine configured to utilize at least one of the one or more hierarchical mappings to implement analytics functionality for the converged infrastructure of the processing platform.

13. The apparatus of claim 1 further comprising a visualization generator configured to generate a graphical representation of at least one of the one or more hierarchical mappings for presentation in a user interface wherein the graphical representation comprises a plurality of elements at each of a plurality of hierarchical levels and wherein actuation of a given one of the elements of a given one of the hierarchical levels via the user interface causes interconnections between the given element and related elements in one or more other hierarchical levels to be highlighted in the graphical representation.

14. A method comprising:
identifying and categorizing resources of converged infrastructure of a processing platform;
generating one or more hierarchical mappings of applications, services and resources for the converged infrastructure by:
mapping at least first and second applications of the processing platform to respective sets of services utilized by those applications, wherein relationships between the mapped applications and services are expressed as a first set of bidirectional links from the applications to the services; and
mapping each of the services to respective sets of the identified and categorized resources utilized by those services, wherein relationships between the mapped services and resources are expressed as a second set of bidirectional links from the services to the resources;
storing the one or more generated hierarchical mappings in a database; and
utilizing the one or more stored hierarchical mappings to perform orchestration for one or more additional applications of the processing platform the orchestration comprising:
querying existing application, service and resource elements at respective levels of the one or more hierarchical mappings stored in the database;
utilizing discovered relationships among those queried elements in determining a particular arrangement for the one or more additional applications based at least in part on the querying; and
configuring the one or more additional applications and one or more additional services utilized by the one or more additional applications by automatically arranging resources into services for use by the one or more additional applications;
wherein the identifying, generating, storing and utilizing are performed by at least one processing device comprising a processor coupled to a memory.

15. The method of claim 14 further comprising utilizing at least one of the one or more hierarchical mappings to implement analytics functionality for the converged infrastructure of the processing platform.

16. The method of claim 14 further comprising generating a graphical representation of at least one of the one or more hierarchical mappings for presentation in a user interface wherein the graphical representation comprises a plurality of elements at each of a plurality of hierarchical levels and wherein actuation of a given one of the elements of a given one of the hierarchical levels via the user interface causes interconnections between the given element and related elements in one or more other hierarchical levels to be highlighted in the graphical representation.

17. A non-transitory processor-readable storage medium having stored therein program code of one or more software programs, wherein the program code when executed by at least one processing device causes the processing device:

to identify and categorize resources of converged infrastructure of a processing platform;

to generate one or more hierarchical mappings of applications, services and resources for the converged infrastructure by:

mapping at least first and second applications of the processing platform to respective sets of services utilized by those applications, wherein relationships between the mapped applications and services are expressed as a first set of bidirectional links from the applications to the services; and mapping each of the services to respective sets of the identified and categorized resources utilized by those services, wherein relationships between the mapped services and resources are expressed as a second set of bidirectional links from the services to the resources;

to store the one or more generated hierarchical mappings in a database; and to utilize the one or more stored hierarchical mappings to perform orchestration for one or more additional applications of the processing platform the orchestration comprising:

querying existing application, service and resource elements at respective levels of the one or more hierarchical mappings stored in the database;

utilizing discovered relationships among those queried elements in determining a particular arrangement for the one or more additional applications based at least in part on the querying; and configuring the one or more additional applications and one or more additional services utilized by the one or more additional applications by automatically arranging resources into services for use by the one or more additional applications.

18. The processor-readable storage medium of claim 17 wherein the program code when executed by said at least one processing device further causes the processing device to utilize at least one of the one or more hierarchical mappings to implement analytics functionality for the converged infrastructure of the processing platform.

19. The processor-readable storage medium of claim 17 wherein the program code when executed by said at least one processing device further causes the processing device to generate a graphical representation of at least one of the one or more hierarchical mappings for presentation in a user interface wherein the graphical representation comprises a plurality of elements at each of a plurality of hierarchical levels and wherein actuation of a given one of the elements of a given one of the hierarchical levels via the user interface causes interconnections between the given element and related elements in one or more other hierarchical levels to be highlighted in the graphical representation.

20. The processor-readable storage medium of claim 17 wherein the orchestration functionality further comprises interacting with application requests and composing one or more new services responsive to at least one of the application requests, and further wherein a corresponding one of the one or more hierarchical mappings is modified to include an entry for the new service and bidirectional links between the new service and each of one or more resources on which the new service is composed.

* * * * *

UNITED STATES PATENT AND TRADEMARK OFFICE
CERTIFICATE OF CORRECTION

PATENT NO. : 10,027,596 B1
APPLICATION NO. : 15/139881
DATED : July 17, 2018
INVENTOR(S) : John S. Harwood Page 1 of 1

It is certified that error appears in the above-identified patent and that said Letters Patent is hereby corrected as shown below:

In the Specification

Column 15, Line 18, please delete "be now be" and replace it with --now be--

In the Claims

Claim 14, Column 18, Line 47, please add a --,-- after "processing platform"
Claim 17, Column 19, Line 36, please add a --,-- after "processing platform"
Claim 20, Column 20, Line 32, please delete "functionality"

Signed and Sealed this
Eleventh Day of September, 2018

Andrei Iancu
*Director of the United States Patent and Trademark Office*